United States Patent [19]

Mery

[11] Patent Number: 5,609,227

[45] Date of Patent: Mar. 11, 1997

[54] BRAKE APPLICATION DEVICE WITH PLATES, BALLS AND A CENTERING CAGE

[75] Inventor: Jean Claude Mery, Pavillons-Sous-Bois, France

[73] Assignee: AlliedSignal Europe Services Techniques, Drancy, France

[21] Appl. No.: 182,168

[22] PCT Filed: Jan. 19, 1994

[86] PCT No.: PCT/FR94/00062

§ 371 Date: Jan. 25, 1994

§ 102(e) Date: Jan. 25, 1994

[87] PCT Pub. No.: WO94/19617

PCT Pub. Date: Sep. 1, 1994

[30] Foreign Application Priority Data

Feb. 16, 1993 [FR] France ................................. 93 01706

[51] Int. Cl.⁶ ............................................... F16D 65/16
[52] U.S. Cl. .................................... 188/72.7; 188/72.6
[58] Field of Search ...................... 188/72.7, 72.8, 188/106 F, 71.4, 71.3, 72.6, 71.9, 71.8; 192/70.11, 70.23, 70.24, 94, 93 R, 93 A, 93 C

[56] References Cited

U.S. PATENT DOCUMENTS

| 3,638,763 | 2/1972 | Laverdant | 188/72.6 |
| 3,991,859 | 11/1976 | Coulter et al. | 188/72.7 |
| 4,550,810 | 11/1985 | Price et al. | 188/72.7 |
| 5,038,895 | 8/1991 | Evans | 188/72.7 |
| 5,263,554 | 11/1993 | Mery | 188/72.7 |
| 5,487,452 | 1/1996 | Moinard et al. | 188/72.7 |

FOREIGN PATENT DOCUMENTS

| 2638214 | 4/1990 | France . |
| 2092248 | 8/1982 | United Kingdom . |

*Primary Examiner*—Douglas C. Butler
*Attorney, Agent, or Firm*—Leo H. McCormick, Jr.

[57] ABSTRACT

A brake-application device having first (8) and second (9) plates, one of which rotates. A plurality of guide cavities (80, 81, 90, 91) are formed in at least one plate (8,9). A corresponding plurality of balls (10, 11, 12) located in the guide cavities (80, 81, 90, 91) are held between the first (8) and second (9) plates. A support disk (14) is placed between the first (8) and second (9) plates and pierced to define circular housing (140, 141, 142) for holding the balls (10, 11, 12) in a relative angular positions. First (148a) and second (149a) central protuberances, respectively, extend from first (148) and second (149) faces on the support disk (14) and are correspondingly located in axial bores (84) and (94) in the first (8) and second (9) plates to define a mechanical unit.

2 Claims, 2 Drawing Sheets

BRAKE APPLICATION DEVICE WITH PLATES, BALLS AND A CENTERING CAGE

The present invention relates to a brake-application device comprising: two plates having opposite faces which are substantially parallel to each other, at least one of these plates being capable of being driven in a rotational movement about an axis perpendicular to these faces; a plurality of guide cavities formed in at least one of these plates at a distance from the axis; a plurality of corresponding balls engaged in the cavities and held tightly between the two plates; and a support disk placed in between the plates and pierced with circular housings in which the balls are maintained in fixed relative angular positions, this disk having, on at least one of its faces, a central protuberance engaged in a corresponding axial bore made in the plate arranged opposite this face.

Devices of this type are well known in the prior art and are used, for example, as shown in U.S. Pat. No. 5,038,895 for the control device for the application of a hand brake in motor vehicles.

A problem commonly encountered in the manufacture of these devices, which comprise numerous components, is that their assembly entails each of these components being fitted in a painstaking way under very poor accessibility conditions.

Such is the context for the present invention which proposes to improve substantially the manufacture of these devices.

To this end, the device of the invention is essentially characterized in that the support disk includes, on each of its faces, elastic means capable of ensuring axial securing of this support disk to the plate arranged opposite this face.

For example, it is possible to ensure that the support disk has a central protuberance on each of its faces, in that the plates have respective axial bores opposite these protuberances, and that each of these protuberances is engaged by force in one of these bores, this arrangement allowing the subassembly consisting of the plates, the balls and disk to be assembled under excellent accessibility conditions, it then being possible for this subassembly to be inserted into the assembly intended to receive it in a single operation.

Furthermore, and according to a preferred embodiment of the invention, at least one of the protuberances has the shape of an expandable elastic clip.

The invention will now be described by way of example with reference to the accompanying drawings in which.

Figure 1:
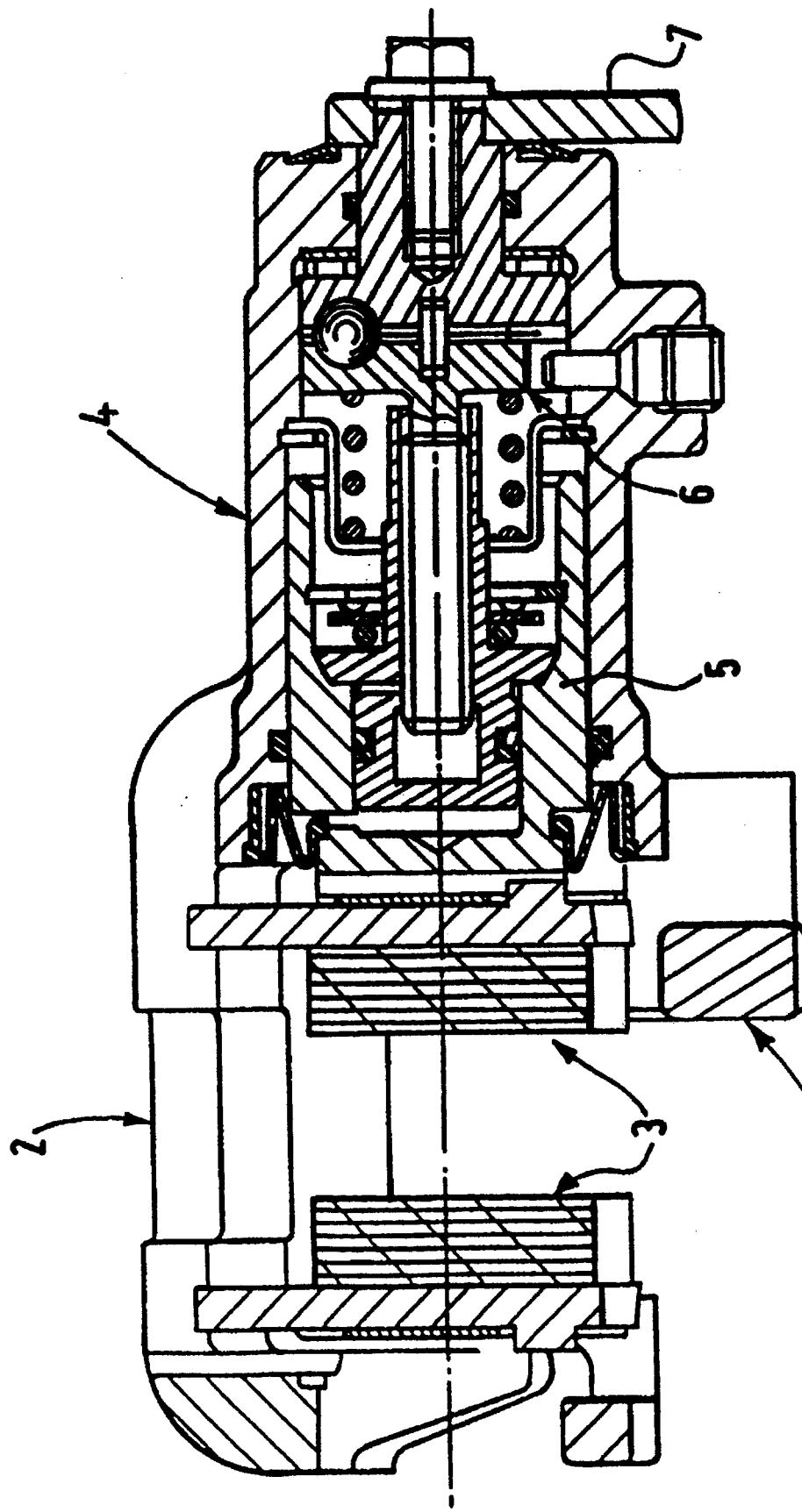
FIG. 1 is a sectional view of a disk brake employing a brake-application device with a rotating plate according to the invention

FIG. 1 illustrates a disk brake of known type comprising a cap 1, a sliding caliper 2 equipped with frictional members 3, and a brake motor 4.

The brake motor itself comprises a piston 5 which can be actuated either hydraulically or mechanically via a brake-application device 6 with plates moved by a lever 7.

Figure 2:
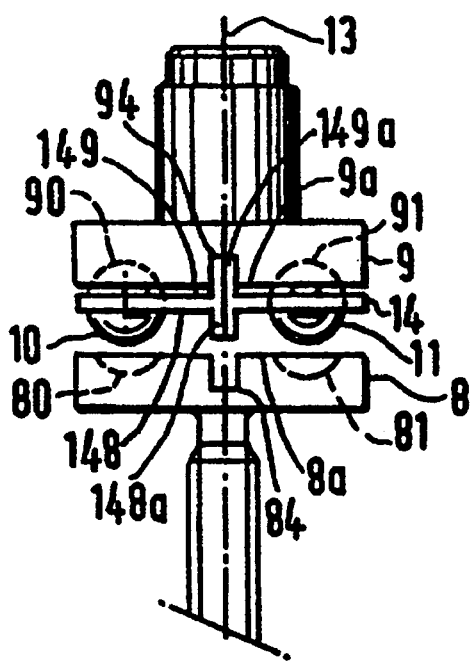
FIG. 2 is a partial exploded sectional view of such a brake-application device with a rotating plate.
Figure 3:
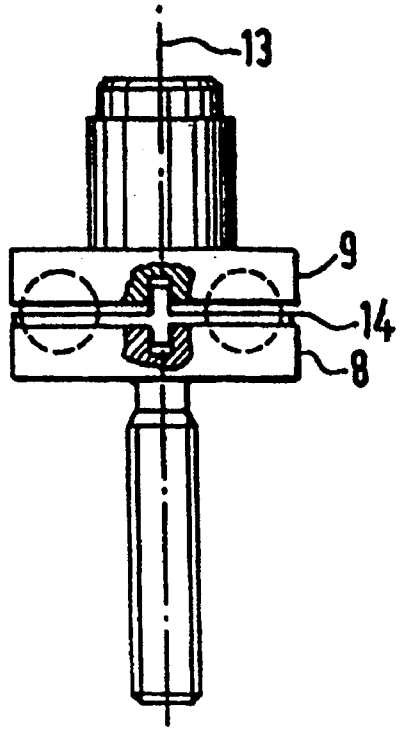
FIG. 3 is a sectional view similar to FIG. 2 that illustrates the brake-application device with a rotating plate after it has been assembled.
Figure 4:
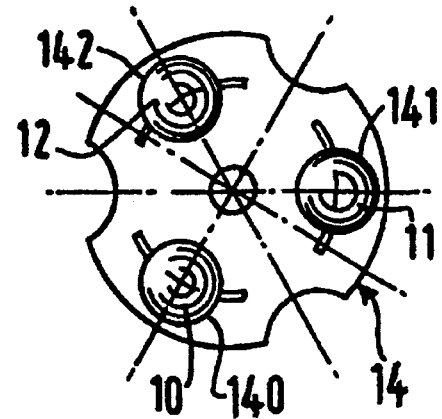
FIG. 4 is a top view of the support disk.
Figure 5:
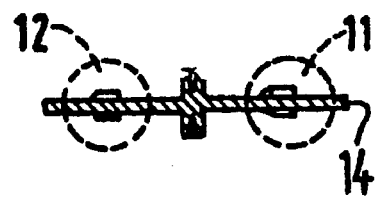
FIG. 5 is a side view of the support disk.

Such a brake-application device, which can be seen more clearly in FIGS. 2 and 3, comprises first and second plates 8 and 9 which are substantially parallel to each other and grip balls such as 10, 11 and 12 between their opposite front faces 8a and 9a.

These plates can be rotated relative to each other by at least one of them being driven in rotation about an axis 13 perpendicular to the faces 8a and 9a of these plates.

The balls 10, 11 and 12 are housed in identical guide cavities such as 80, 81, 90 and 91 formed in at least one of the plates and are thus gripped between the latter.

However, these balls are also engaged in respective circular housings 140, 141 and 142 of a support disk 14 placed in between the plates and by virtue of which these balls are held in fixed relative angular positions.

The support disk 14 has a central protuberance such as 148a and 149a arranged on the axis of rotation 13 on each of its faces 148, 149, the two protuberances being engaged by force in axial bores 84 and 94 which are respectively formed in the plates 8 and 9 opposite these protuberances.

Figure 6:
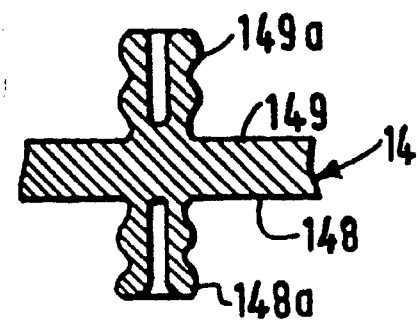
FIG. 6 is an enlarged sectional view of the centering protuberances of the support disk.

The protuberances preferably (FIG. 6) each have the shape of an expandable elastic clip which gives the protuberances inserted into the axial bores a certain resistance to being torn out and, as shown in FIG. 3, enables the brake-application device to be assembled in the form of a single mechanical unit which can be easily assembled and fitted.

According to another possible embodiment, a protuberance of at least one of the faces of the support disk 14, for example the protuberance 148a of the face 148, may be replaced by uniformly spaced lugs on the periphery of this disk 14, which are, for example, three in number, and each of which is capable of moving away elastically toward the outside of the periphery of this disk 14 in order to seek a bearing point on the rear face of the plate 8 which is arranged opposite this face 148.

I claim:

1. A brake-application device comprising: first and second plates having opposite first and second disc faces, respectively, which are substantially parallel to each other, at least one of said first and second plates being capable of being driven in rotational movement about an axis perpendicular to said first and second faces, a plurality of guide cavities formed in at least one of said first and second plates at a fixed distance from said axis; a plurality of corresponding balls located in said guide cavities and held between said first and second plates, and a support disk placed between the first and second plates and pierced with circular housings in which the said balls are held in fixed relative angular positions, said first and second disk faces are respectively provided with first and second central protuberances, while said first and second plates are respectively provided with first and second axial bores, said first and second central protuberances being resiliently engaged in said respective first and second axial bores to secure said support disk to said first and second plates.

2. The brake-application device according to claim 1, wherein at least one of said first and second protuberances has the form of an expandable elastic clip.

* * * * *